INVENTORS
Leon R. Lapp
BY Edward A. Burkard
ATTORNEY

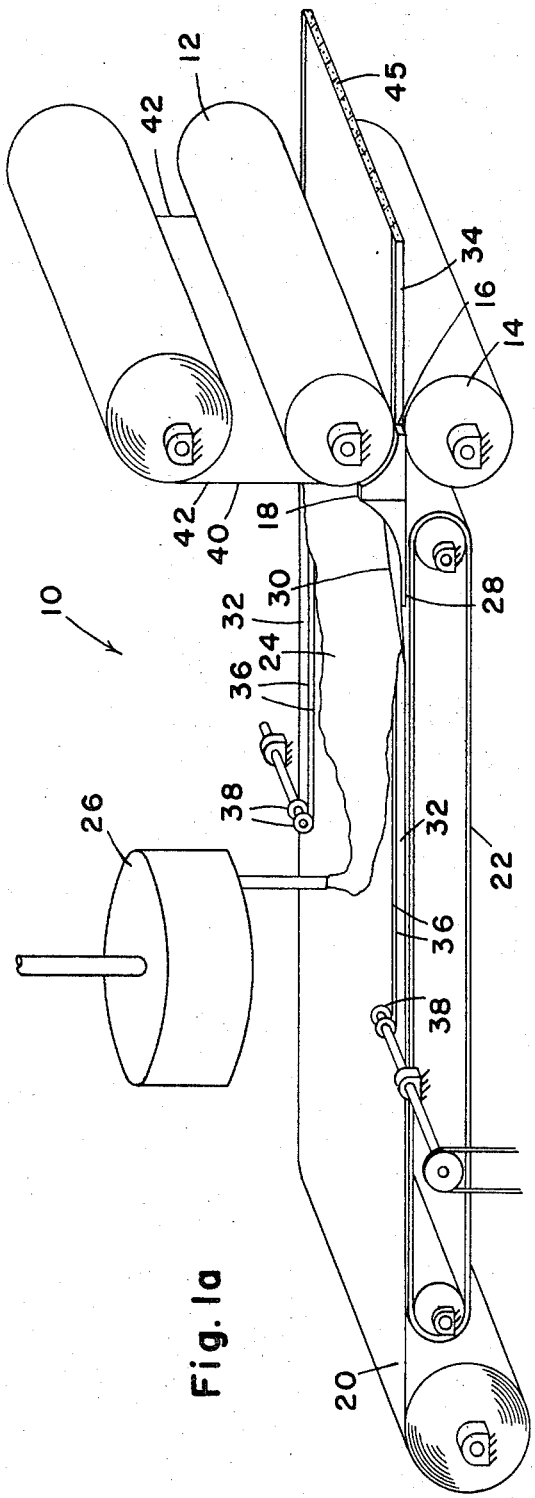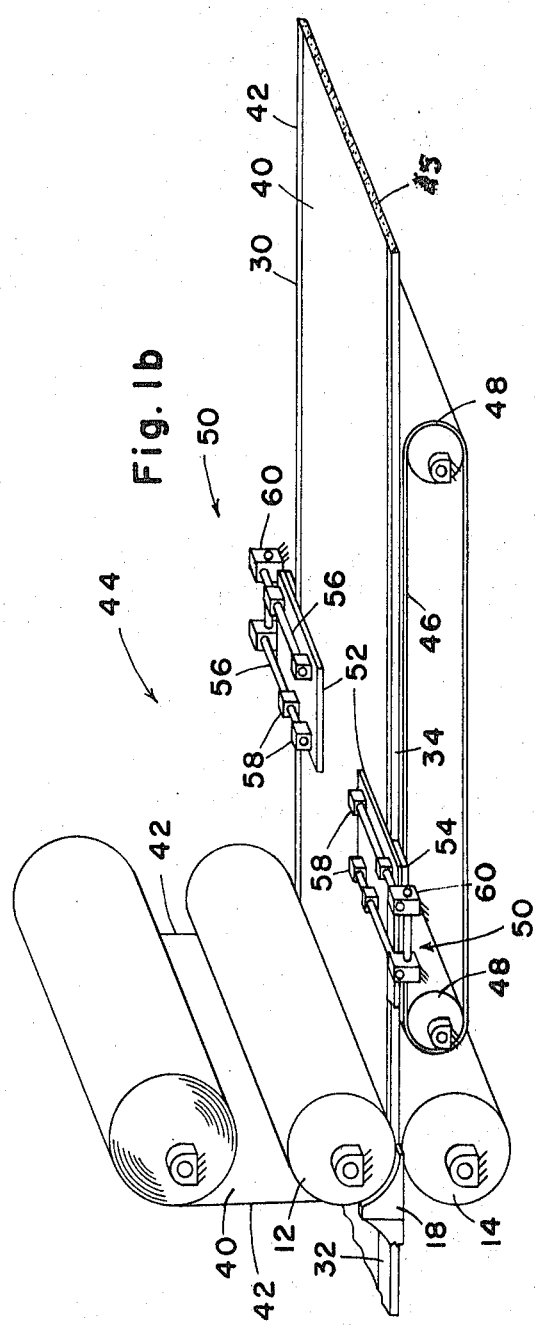

May 11, 1971  L. R. LAPP ETAL  3,578,517
GYPSUM BOARD FORMING

Filed Aug. 26, 1968  4 Sheets-Sheet 4

INVENTORS
Leon R. Lapp
BY Edward A. Burkard

Robert F. Hause
ATTORNEY

United States Patent Office 3,578,517
Patented May 11, 1971

3,578,517
GYPSUM BOARD FORMING
Leon R. Lapp and Edward A. Burkard, East Amherst, N.Y., assignors to National Gypsum Company, Buffalo, N.Y.
Filed Aug. 26, 1968, Ser. No. 755,149
Int. Cl. B32b *13/04*
U.S. Cl. 156—40          10 Claims

ABSTRACT OF THE DISCLOSURE

A method and machine for forming wrapped edges of paper-enclosed gypsum board, wherein the bottom cover sheet side edges are folded upward and inward, underlapping the side edges of the top cover sheet, and containing therewithin the unset gypsum slurry. The contacting surfaces of the lapped edges are kept clean and free of adhesive until forming is complete, after which they are slightly separated, a contact adhesive is applied and they are then firmly adhered, one to another.

BACKGROUND OF THE INVENTION

Gypsum wallboard is commonly manufactured by a continuous process, wherein an aqueous gypsum slurry is deposited on a continuously advancing bottom paper sheet having its side edges folded upwardly. A top paper sheet is continuously fed atop the slurry and, prior to contact, a paste adhesive is applied to the bottom surface of the top sheet, adjacent the side edges. The top sheet is guided immediately under a cylindrical master forming roll, whereat it is pressed firmly atop the slurry and the turned up bottom sheet edges. The bottom sheet edges are folded inwardly and the top surface of the turned in edge becomes loosely adhered to the paste adhesive on the bottom of the top sheet edges. The forming of the board, to its final desired width and thickness, progresses as the components advance to the bottommost point of the forming roll, with a slight excess of slurry constantly being fed thereto forcing the paper cover sheets to form into the widest and thickest form possible, as limited by fixed side guides and by the space between the forming roll and the conveyor, thereunder. As the final forming is going on, the two paper sheet edge portions shift slightly to adjust to changes occurring in the width and thickness. Paste adhesives or equivalent, which permit movement of sheets pasted together for a reasonable period of time after application, were thus a requisite in order to permit this final adjustment of relative positioning.

After the formed board progresses beyond the forming roll, it continues on as a continuous endless board for about a thousand feet, as the gypsum core sets and hardens. Unavoidable degrees of vibrations during this movement tend to cause the unset slurry to urge the folded upward paper edges to move outwardly and the paste adhesive permits slight, and varying degrees, of movement outwardly of the underlapped bottom sheet edge.

To counteract this movement, the guides used in forming the edges were commonly shaped to initially form the upper edge inwardly of the desired final shape, and the edge is expected to shift outwardly to the desired final shape as the core is setting and hardening. This will be seen to be a relatively uncontrolled change in edge formation and thus subject to variations, resulting in occasional unacceptable edge formation.

SUMMARY OF THE INVENTION

The present invention takes advantage of the relative stiffness of wallboard paper, sufficient for it to stay in a desired folded over and underlapped form without any adhesive on the edges as it advances a very short distance beyond the masterforming roll.

A short distance beyond the master roll, the wallboard edges pass through a novel edge shoe which includes guides holding the board edge in the desired shape and includes a knife-like lifter lifting slightly the overlapped top sheet edge. An adhesive applicator deposits a contact adhesive on the top of the folded over edge. Further along on the edge shoe a guide presses the top sheet edge back down onto the contact adhesive, pressing the board edge into a final form, unchangeable insofar as the relationship of the lapped paper edges.

It is an object of the invention to provide a novel method of making paper covered gypsum wallboard having improved control of the forming and resulting in a more uniform quality product.

These and other objects of the invention will be more fully apparent when considered in connection with the following detailed description of a preferred embodiment of the invention and the accompanying drawings in which:

FIGS. 1a and 1b are perspective diagrammatic views of the forming portion of a gypsum wallboard machine, embodying the present invention.

Figure 5:
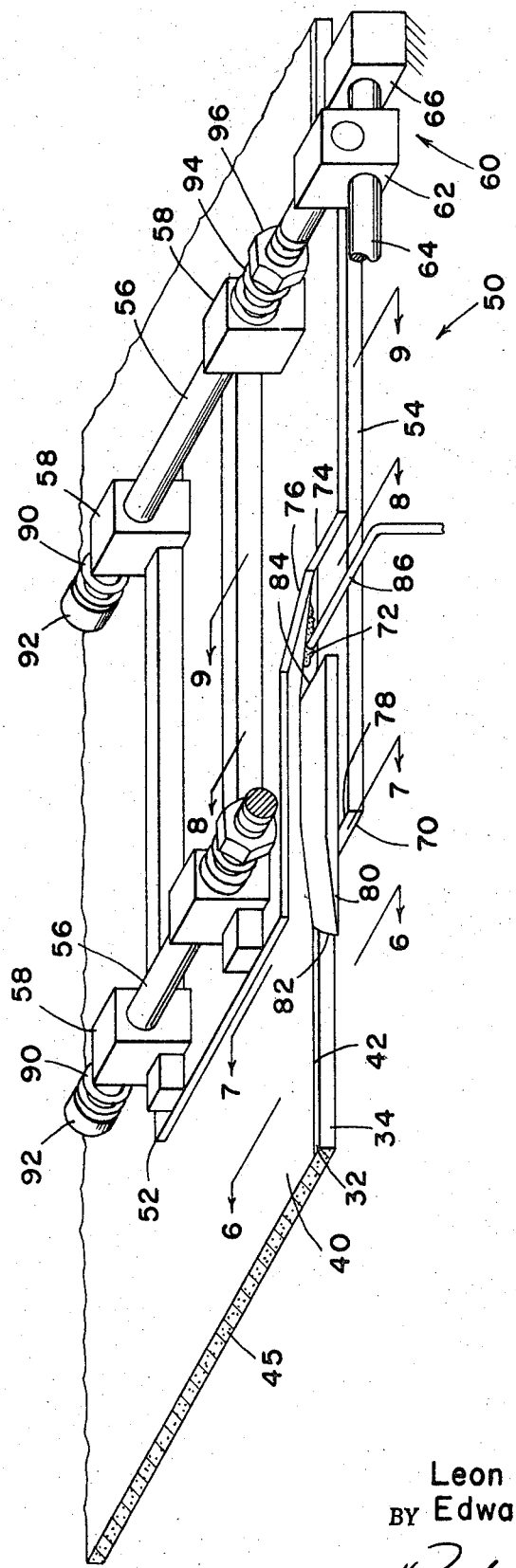
FIG. 5 is a perspective view of the wallboard edge shoe of FIGS. 2, 3, and 4, with a wallboard edge progressing therethrough.

FIGS. 6, 7, 8 and 9 are end sectional views taken respectively on planes 6—6, 7—7, 8—8 and 9—9 of FIG. 5.

Referring to FIG. 1a, there is shown the board forming section 10 of a gypsum wallboard machine up to the master roll 12 whereat the board width and thickness are determined, by the spacing between the master roll 12 and a lower supporting roll 14, and by the width between the two side edge blocks 16, 16 (not now shown) which are part of points 18, 18. A lower paper sheet 20 is fed along a conveyor 22 and an aqueous slurry 24 of settable gypsum is continuously fed thereto from a standard cylindrical pin mixer 26.

As the paper and gypsum slurry approach the master roll 12, a fixed folding shoe 28, on the forward end of each point 18, progressively folds upwardly an outer folded portion 30 of about 1½ inches width at each board edge, and then proceeds to fold inwardly the upper, one inch wide, underlap portion 32, leaving the lower half inch edge portion 34 disposed substantially vertical. It will be understood that the width of the underlap portion 32 can be varied considerably as will be understood from the further disclosure herebelow, while the width of the edge portion will be determined by the thickness of the wallboard edge desired, the example hereabove being of a ½ inch thick board edge. The location of the folds, and thus the determination of these widths, is maintained by grinding small grooves 36 in the upper paper surface by two pairs of thin grinding wheels 38.

As the lower paper sheet, with the folded edges and with the aqueous gypsum slurry thereon, approach the fixed size opening beneath the master roll 12, an upper paper sheet 40 is fed to the master roll 12 and thus to atop the lower paper folded portions 30, 30 and the slurry 24. The upper paper sheet 40 is substantially narrower than the lower paper sheet 20 and has overlapping edge portions 42, 42 which preferably overlap about ¾ inch each of the two one inch wide underlapped portions 32, 32.

All of the above discussion of the combining and the forming of the components of gypsum board is in accordance with common prior practice, with the exception that in prior practice an aqueous paste was commonly applied to the bottom surface of the overlapping edge portions 42, 42, just prior to its contacting the underlapped portions 32, 32. In the present invention the board is formed and emerges from between the master roll 12 and the supporting roll 14 with no adhesive between the overlapping edge portions 42, 42 and the underlapped portions 32, 32. During the forming, at the master roll, it is essential that the overlapping portions 42, 42 and the respective underlapped portions 32, 32 be free to slide relative to one another, as was possible with the prior paste adhesives and is obviously still possible with no adhesive, permitting the squeezing action of the master roll 12 to force the aqueous slurry 24 to completely fill the board edges pushing the paper edge portions 34, 34 firmly against the edge blocks 16, 16.

Referring to FIG. 1b, there is shown an adjacent portion 44 of the gypsum wallboard machine, which immediately follows the forming section 10 of FIG. 1a. As close to the supporting roll as reasonably possible the continuous formed board 45 emerging from below the master roll is supported by a conveyor belt 46 mounted on conveyor supporting rolls 48, 48.

As close to the starting end of the conveyor belt 46 as reasonably possible there are removably and adjustably mounted, at each side edge of the conveyor, a novel edge sealing shoe 50, 50. The body of each shoe 50 includes a stainless steel top plate 52, which rests lightly but firmly on the upper paper sheet 40 as the continuous formed board 45 moves along on conveyor belt 46, and an interchangeable stainless steel edge bar 54 disposed between top plate 52 and conveyor belt 46, which is held firmly against the vertically disposed paper edge portion 34 as the board 45 moves along on conveyor belt 46. The edge bar 54 is interchangeable with other edge bars of different thickness whereby the shoe 50 may be used with any desired thickness of the edge of board 45.

Each shoe 50 is mounted on a pair of support rods 56 each of which extend through a respective pair of raised bosses 58 welded atop the top plate 52 in the vicinity of each of the four corners thereof. The rods 56 extend from the shoes laterally outwardly beyond the side edge of the conveyor belt 46 whereat each rod 56 is pivotally mounted in a suitable pivot mounting 60.

The shoes 50, 50 may be firmly affixed to their respective support rods 56 if they are mounted close enough to the master roll so that the board 45 passing through the shoes 50, 50 does not shift at all from side to side. In the present embodiment means are provided to permit proper functioning even if some side-shifting of the board 45 occurs. The rods 56 are slidably mounted through the raised bosses 58. Outer compression springs 90 are mounted adjacent the end of rods 56 between an enlarged head 92 on the end of each rod 56 and the respective outer boss 58. Inner compression springs 94 are mounted on rods 56 inward of the inner bosses 58 between the respective boss 58 and a compression adjustment lock nut 96 threadedly mounted on each rod 56.

Figure 2:
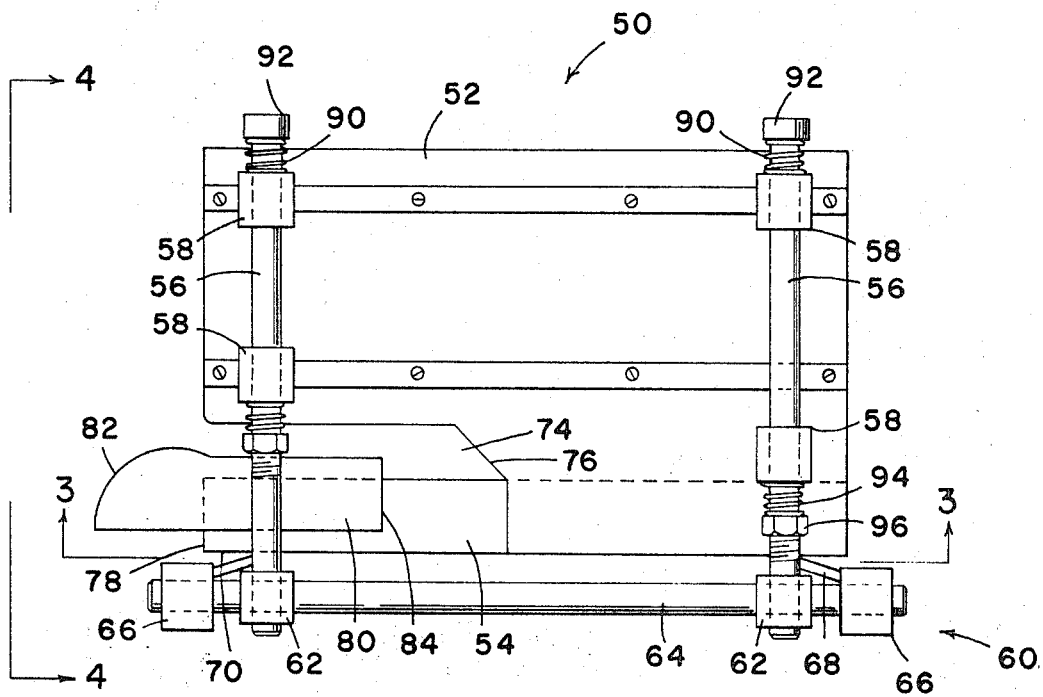
FIGS. 2, 3 and 4 are respectively the top, side and end views of one of the novel wallboard edge shoes of FIG. 1b.
Figure 3:
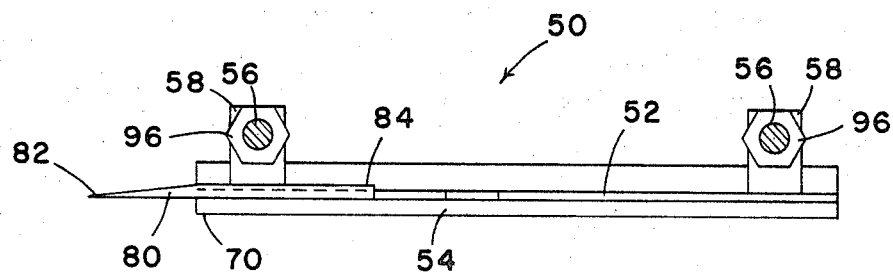
Figure 4:
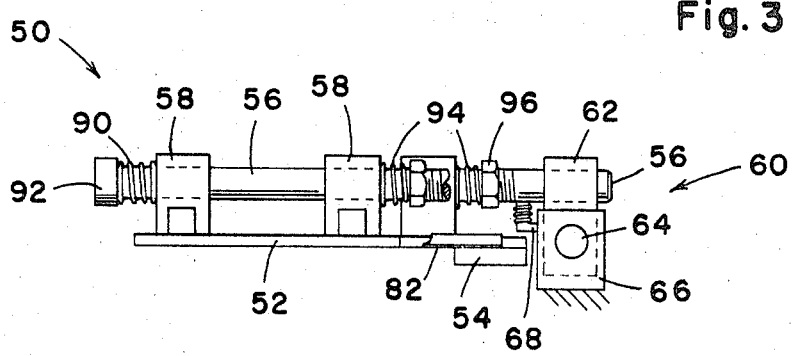

A suitable pivot mounting 60 includes, as seen in FIGS. 2 and 4, a pair of rotatable blocks 62, 62 fixedly joining supporting rods 56 to a perpendicularly extending rotatable shaft 64. Shaft 64 is rotatably mounted in a pair of fixed blocks 66, 66, whereby shoe 50 may be raised and lowered by pivoting about the axis of rotatable shaft 64. To permit control of the extent to which the weight of shoe 50 rests on the top of the board 45, an adjustable stop 68 extends from each fixed block 66 to beneath each respective supporting rod 56.

FIGS. 2, 3, 4 and 5 show more clearly the structure of shoe 50 and the relationship of the structure of shoe 50 to the continuous board 45 passing therethrough. The outer edge corner 70 of shoe 50, which is closest to master roll 12, is constructed to lift slightly the overlapping portion 42 of upper paper sheet 40 and to deposit thereunder, on underlap portion 32, a substantially continuous bead 72 of a contact type adhesive. By contact type adhesive it shall be understood that any suitable adhesive is contemplated which is suitable for adhering paper surfaces in a manner such that immediately after the surfaces are firmly pressed together to spread the adhesive to a thin layer substantially throughout the contacting surfaces, the two surfaces are held in fixed relationship sufficient to prevent any relative movement of one said surface to another as a result of any subsequent movement, vibration, handling, etc. of the continuous board.

The shoe outer edge corner 70 has a portion of top plate 52 thereat which has a cutaway portion 74 leaving edge bar 54 extending out from under top plate 52 in a direction toward the master roll 12. The top plate cutaway portion 74 is cut away to at least inwardly of the underlapped portion 32 of the lower paper sheet 20, and is cut away to this width for a distance along the length of shoe 50 sufficient to permit of the operation of lifting the overlapping portion 42 and applying the bead 72 on the underlap portion 32. The end of the cutaway portion 74, remote from the master roll 12, is formed with a diagonal corner 76, which portion of top plate 52 presses the overlapping portion 42 back down on the underlap portion 32 as the board 45 passes thereunder, and, by reason of the diagonal extent of corner 76, performs the pressing down progressively from nearer the center of board 45 outwardly to the outer edge of overlapping portion 42.

On the end 78 of edge bar 54 in corner 70 there is mounted a paper-edge-lifter blade 80 having a thin, but not sharp, curved edge 82 extending from end 78 in a direction toward the master roll 12 and in a direction toward the center of the continuous board 45 which in operation is disposed between the underlap portion 32 and the overlapping portion 42. As the continuous board 45 continuously moves toward the leading edge 82 of lifter blade 80, the overlapping portion 42 of upper paper sheet 40 is continuously lifted up, away from the underlap portion 32, and it continuously rides over the top surface of lifter blade 80. The trailing edge 84 of lifter blade 80 is of sufficient thickness to raise the overlapping portion 42 high enough to permit a substantially continuous bead 72 of adhesive to be fed in between the overlapping portion 42 and the underlap portion 32. The adhesive is fed through a small diameter tube 86 which is mounted to extend in between the overlapping portion 42 and the underlap portion 32. A suitable source of supply of adhesive and a pump, not shown, may be provided to continuously feed the contact adhesive, in a liquid form, to tube 86. Means for feeding adhesive could vary considerably and the form of adhesive could vary. A hot melt adhesive may be fed through tube 86 provided suitable heating means are provided to melt the adhesive and maintain it in liquid form until deposited. A relatively solid tape of double faced contact adhesive could be continuously fed onto the top surface of the underlap portion.

Figure 6:
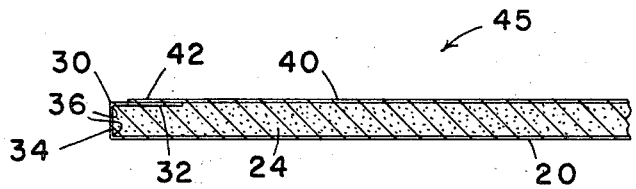
Figure 7:
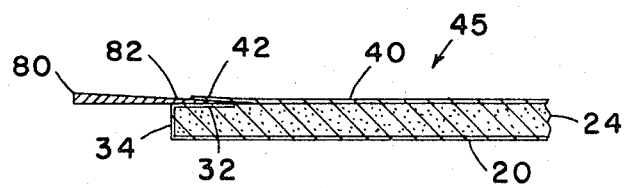
Figure 8:
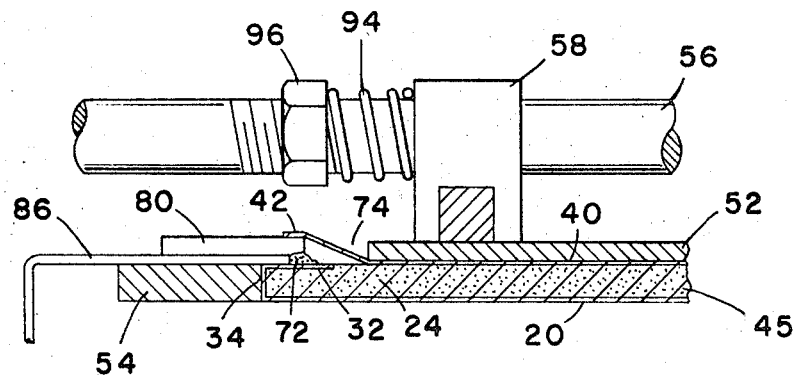

FIGS. 6, 7, 8 and 9 show in cross section the relationship of continuous board 45 to the various portions of shoe 50 as the board progresses through the shoe. FIG. 6 shows the overlapping portion 42 resting on but not adhered to the underlap portion 32. FIG. 7 shows the lifter blade 80 raising the overlaping portion 42. FIG. 8 shows the tube 86 extending under the overlapping portion 42 depositing a bead 72 of contact adhesive, with the portion of top plate 52, adjacent the cutaway portion 74, holding the main portion of the upper paper sheet 40 from tending to lift off the aqueous slurry 24.

Figure 9:
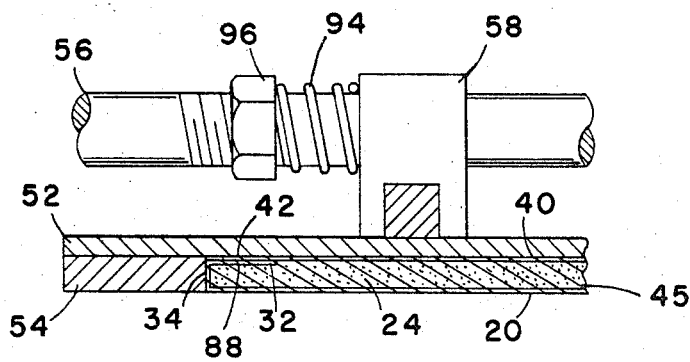

In FIG. 9 the overlapping portion 42 has been pressed down onto the underlap portion 32 by the top plate 52, causing the adhesive to immediately spread to a thin adhesive layer 88. The rate of feed of adhesive through tube 86 is regulated to provide a bead 72 of sufficient size that, pressed down and spread out, the adhesive layer extends substantially the width which overlapping portion 42 overlaps underlap portion 32.

Having completed a detailed disclosure of the preferred embodiment of our invention so that those skilled in the art may practice the same, we contemplate that variations may be made without departing from the essence of the invention or the scope of the appended claims.

We claim:

1. In the continuous manufacture of board from a settable gypsum core enclosed within a paper sheet, the improvement comprising the steps of overlapping adjacent longitudinal edge portions of said paper sheet, maintaining said overlapped portions substantially free of any adhesion therebetween during a final forming of said settable gypsum and said paper sheet, subsequently inserting a contact adhesive between said overlapped portions and immediately firmly adhering said overlapped portions together, whereby said overlapped portions remain in fixed relative position during all subsequent handling of said board.

2. The method of claim 1 wherein a lower paper sheet and an upper paper sheet are continuously advanced and an aqueous slurry of settable gypsum is continuously deposited on said lower paper sheet, and wherein said overlapping adjacent longitudinal edge portions of said paper sheet are formed by continuously folding the edges of said lower paper sheet upwardly and inwardly and disposing said upper paper sheet with the longitudinal edge portions thereof overlapping at least a portion of said inwardly folded lower paper sheet edge.

3. The method of claim 2 wherein at least two distinct folds are formed in each lower paper sheet edge forming a substantially vertical edge portion of said board therebetween.

4. The method of claim 2 wherein said final forming consists of continuously advancing said lower paper sheet and said upper paper sheet, with settable gypsum therebetween, through a fixed size opening causing said paper sheets to conform to the shape of said opening.

5. The method of claim 4 wherein said fixed sized opening comprises a continuously advancing lower supporting means, an upper cylindrical master roll and two opposed fixed side edge blocks.

6. The method of claim 1 further comprising continuously advancing formed board subsequent to said final forming, disposing a lifter blade in fixed relation to said overlapped portions of said advancing final formed board, continuously lifting one of said continuously advancing longitudinal edges away from the other said continuously advancing longitudinal edge, depositing a substantially continuous bead of a contact adhesive immediately adjacent said lifted blade, and pressing said overlapped portions together with said adhesive therebetween.

7. A wall board edge shoe for continuously lifting an unadhered, overlapped continuously advancing paper sheet lateral edge for depositing contact adhesive thereunder, said shoe comprising a substantially flat top plate having a bottom face for disposition on the wallboard top face, an edge bar having aside edge for disposition against the wallboard side edge and a lifter blade having a thin edge disposed in the plane of said bottom face adjacent said top plate for disposition extending under an overlapping paper sheet edge on the side of said top plate from which said continuously advancing paper sheet is coming, whereby a substantially continuous bead of contact adhesive may be fed under said overlapping edge subsequent to said edge being lifted by said lifter blade and prior to said edge being pressed back down by said top plate.

8. A wallboard edge shoe as defined in claim 7 wherein said top plate has aside portion adjacent said lifter blade extending diagonally toward said edge plate whereby said pressing back down of said edge is accomplished by pressing from the inner portion of the edge progressively outwardly to said edge.

9. A wallboard edge shoe as defined in claim 8 wherein said diagonal side portion is at a cut-away corner of said top plate, said edge plate extending into the area defined by said cut-away corner, said lifter blade being disposed atop said extending portion of said edge plate and having said thin edge extending over the edge of said edge plate which is disposed against the wallboard side edge.

10. A wallboard edge shoe as defined in claim 7 further comprising means for supporting said shoe to rest on said wallboard paper sheet without substantial weight thereon, said supporting means having spring means urging said edge plate lightly against the edge of a continuously advancing wallboard.

References Cited
UNITED STATES PATENTS

| | | | |
|---|---|---|---|
| 1,772,483 | 8/1930 | Griswold | 156—40 |
| 1,997,293 | 4/1935 | Brunner | 156—40X |
| 3,373,065 | 3/1968 | Gutzman et al. | 156—40 |

ROBERT F. STAHL, Primary Examiner

U.S. Cl. X.R.

156—348